United States Patent Office.

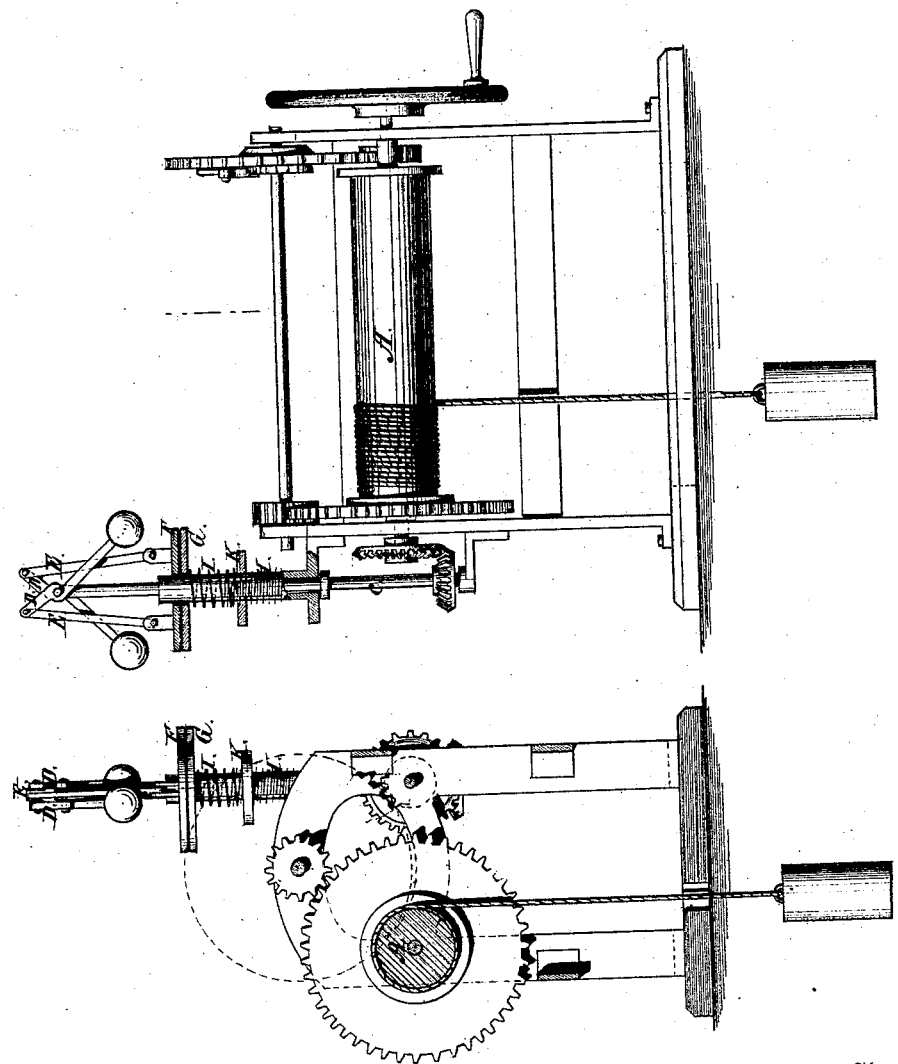

THEODORE C. VAN WYCK AND WILLIAM KENT, OF POUGHKEEPSIE, NEW YORK.

Letters Patent No. 99,376, dated February 1, 1870.

IMPROVEMENT IN REGULATOR FOR MACHINERY.

The Schedule referred to in these Letters Patent and making part of the same.

*To all whom it may concern:*

Be it known that we, THEODORE C. VAN WYCK and WILLIAM KENT, of Poughkeepsie, in the county of Dutchess, and State of New York, have invented a new and improved Regulator for Machinery; and we do hereby declare that the following is a full, clear, and exact description thereof, which will enable others skilled in the art to make and use the same, reference being had to the accompanying drawings, forming part of this specification.

My invention relates to that class of machines which is driven by the evolution of a spring or "a rope and weight;" and consists in attaching thereto a device which will keep the velocity within a certain maximum, and whose retarding action will increase with the speed of the machine.

Figure 1 is a side elevation of our improved machine, and

Figure 2 is a section of the same, taken on the line *x x* of fig. 1.

Similar letters of reference indicate corresponding parts.

A is a weighted drum, arranged in a suitable frame, and provided with suitable multiplying or transmitting-gears, and with a crank-wheel, B, or it may be other means for connection with a reciprocating or revolving-device for operating the machine to be driven. The said train is provided with a wheel, which will slip when turning in the direction for winding up the weight, as is common in such powers.

Our invention consists in the application to one of the fast-moving shafts of the governor-shaft C, weighted levers D, connecting-rods E, disks F G, sleeve H, friction-springs I, and adjusting-nut K.

The said shaft rises up through the sleeve H, attached to the frame in any suitable way, and the bell-crank levers D are pivoted to it.

The disk G is placed loosely on the sleeve H, so as to move up or down, and the disk F is similarly arranged and connected to the levers by the links E.

The lower disk is supported vertically by the spring I, which is itself supported by the screw-nut K.

The movement of the balls to or from the shaft C will move the disk F up or down, the outward movement forcing it down against the said disk G, causing friction between the two disks, and retarding the motion. When the speed decreases, the balls moving toward the shaft will raise the disk F, and reduce the friction.

The governor may be set to allow the machine to run at any required speed, by raising or lowering the nut K. For a slow speed it is raised, and for faster motion it is lowered.

The disk, adjusting-nut, and spring may, by a slight modification of the levers D, be arranged above the said levers.

In machines actuated by a weight or spring, the feed may be light or heavy. If heavy, then the friction will be sufficient of itself to keep the evolution of the spring-weight down to the velocity desired. At times, however, it will be light, when the power of the spring will tend to carry the machine too rapidly, and expend its own power too fast. At these times, the centrifugal power exerted by the shaft C upon the weighted arms D will cause the latter to fly outward. In doing this, they press the disk F more firmly against the disk G, thereby creating great friction, and retarding the velocity of the shaft.

The maximum of speed at which the shaft C is allowed to rotate, and consequently the weight to unwind, is regulated by means of the adjustable nut K and spring I. As the nut is screwed upward against the spring, it causes a greater amount of friction, and *vice versa*.

We are aware that neither weighted levers acted upon centrifugally by a rotating shaft, nor friction-disks, nor an adjustable tension spring, are new by themselves; but What we do claim as of our invention, and desire to secure by Letters Patent, is—

1. The method above described of regulating the evolution of a weighted rope or spring-power, by applying the principle of friction, by means of the devices shown and described, and for the purpose specified.

2. The combination of the frictional disks F G with weighted levers D D, to retard the velocity of the shaft C, at the time and in the manner described.

3. The combination of threaded sleeve and nut H K with spring I, to increase the amount of friction and lessen the maximum of speed, as set forth.

The above specification of our invention signed by us, this 23d day of October, 1869.

THEODORE C. VAN WYCK.
WILLIAM KENT.

Witnesses:
GEO. W. MABEE,
ALEX. F. ROBERTS.